United States Patent
Kourtakis et al.

(10) Patent No.: US 11,260,622 B2
(45) Date of Patent: *Mar. 1, 2022

(54) MULTILAYER POLYMER FILM

(71) Applicant: DUPONT ELECTRONICS, INC., Wilmington, DE (US)

(72) Inventors: Kostantinos Kourtakis, Media, PA (US); Gene M Rossi, Wilmington, DE (US); Leopoldo Alejandro Carbajal, Newark, DE (US); Mark Allan Lamontia, Landenberg, PA (US); Mobin Yahyazadehfar, West Chester, PA (US)

(73) Assignee: DUPONT ELECTRONICS, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/681,119

(22) Filed: Nov. 12, 2019

(65) Prior Publication Data
US 2020/0147945 A1    May 14, 2020

Related U.S. Application Data

(60) Provisional application No. 62/760,523, filed on Nov. 13, 2018, provisional application No. 62/760,506, filed on Nov. 13, 2018, provisional application No. 62/760,499, filed on Nov. 13, 2018, provisional application No. 62/760,488, filed on Nov. 13, 2018, provisional application No. 62/760,478, filed on Nov. 13, 2018.

(51) Int. Cl.
| | |
|---|---|
| *B32B 7/022* | (2019.01) |
| *B32B 27/08* | (2006.01) |
| *B32B 27/20* | (2006.01) |
| *B32B 27/28* | (2006.01) |
| *B32B 7/12* | (2006.01) |
| *B32B 17/10* | (2006.01) |
| *B32B 27/34* | (2006.01) |

(52) U.S. Cl.
CPC ............ *B32B 7/022* (2019.01); *B32B 7/12* (2013.01); *B32B 17/10* (2013.01); *B32B 27/08* (2013.01); *B32B 27/20* (2013.01); *B32B 27/281* (2013.01); *B32B 27/34* (2013.01); *B32B 2250/24* (2013.01); *B32B 2264/102* (2013.01); *B32B 2307/412* (2013.01); *B32B 2307/51* (2013.01); *B32B 2457/206* (2013.01); *Y10T 428/31721* (2015.04)

(58) Field of Classification Search
CPC ......... B32B 7/022; B32B 27/08; B32B 27/20; B32B 27/281; B32B 7/12; B32B 17/10; B32B 27/34; B32B 2264/102; B32B 2307/412; B32B 2457/206; B32B 2250/24; B32B 2307/51; Y10T 428/31721
See application file for complete search history.

(56) References Cited

U.S. PATENT DOCUMENTS

| | | | |
|---|---|---|---|
| 2,801,185 | A | 7/1957 | Iler |
| 4,522,958 | A | 6/1985 | Das et al. |
| 5,648,407 | A | 7/1997 | Goetz et al. |
| 2008/0138537 | A1* | 6/2008 | Simone .................. C08L 79/08 428/1.1 |
| 2015/0118462 | A1 | 4/2015 | Hwang et al. |
| 2015/0147532 | A1 | 5/2015 | Nam et al. |
| 2015/0183932 | A1 | 7/2015 | Katayama et al. |
| 2016/0048171 | A1 | 2/2016 | Lee et al. |
| 2016/0101593 | A1* | 4/2016 | Nam ....................... B32B 3/04 428/213 |
| 2016/0137789 | A1* | 5/2016 | Suenaga ................. B32B 27/08 428/220 |
| 2018/0088392 | A1 | 3/2018 | Park et al. |

FOREIGN PATENT DOCUMENTS

| | | | |
|---|---|---|---|
| JP | 2014-019108 A | 2/2014 | |
| WO | WO-2018186262 A1 * | 10/2018 | ............. B32B 27/34 |

OTHER PUBLICATIONS

English machine translation of WO2018/186262, dated Oct. 11, 2018.*
PCT International Search Report for Application No. PCT/US2019/061076; Sze Man Yu (Authorized Officer); ISA/EPO; dated Feb. 12, 2020.
PCT International Search Report for Application No. PCT/US2019/061086; Sze Man Yu (Authorized Officer); ISA/EPO; dated Feb. 13, 2020.

* cited by examiner

*Primary Examiner* — Michael C Miggins

(57) ABSTRACT

In a first aspect, a multilayer polymer film includes a first transparent, colorless polymer layer comprising a polyimide, a polyamide imide, or a block copolymer of a polyimide and a second transparent, colorless polymer layer comprising a polyimide, a polyamide imide, or a block copolymer of a polyimide. An elastic modulus of the first transparent, colorless polymer layer is different than an elastic modulus of the second transparent, colorless polymer layer. The first and second transparent, colorless polymer layers are bonded by consolidation. In a second aspect, a cover window for a display includes the multilayer polymer film of the first aspect. The first transparent, colorless layer of the multilayer polymer film is the layer farthest from the display.

12 Claims, No Drawings

MULTILAYER POLYMER FILM

FIELD OF THE DISCLOSURE

This invention is directed to multilayer polymer films and cover windows for displays.

BACKGROUND OF THE DISCLOSURE

There is increasing interest in creating foldable OLED displays to be used in foldable smart phones, small tablets, rollable phones and rollable large display formats for singly and doubly curved displays for such uses as automotive panels and appliance panels.

Polyimide films that contain aromatic monomers are typically very thermally stable and are foldable. In addition to optical requirements, flexibility requirements, surface damage resistance and folding endurance requirements, a cover window must provide severe impact endurance. Like rigid glass that can shatter or withstand an impact wave, a polymer will transmit impact energy via sound waves emanating from the impact directly onto the display. If the impact energy is low, the display will remain intact. As the impact energy increases, the display could suffer damage, at worst, damaging the underlying electronic components and rendering the display useless.

A film construction that can protect the display electronic components from a sharp impact and does not suffer from delamination will be important for flexible displays for portable electronics.

SUMMARY

In a first aspect, a multilayer polymer film includes a first transparent, colorless polymer layer comprising a polyimide, a polyamide imide, or a block copolymer of a polyimide and a second transparent, colorless polymer layer comprising a polyimide, a polyamide imide, or a block copolymer of a polyimide. An elastic modulus of the first transparent, colorless polymer layer is different than an elastic modulus of the second transparent, colorless polymer layer. The first and second transparent, colorless polymer layers are bonded by consolidation.

In a second aspect, a cover window for a display includes the multilayer polymer film of the first aspect. The first transparent, colorless layer of the multilayer polymer film is the layer farthest from the display.

DETAILED DESCRIPTION

Multilayer polymer films can be used to form substantially transparent and foldable films. In a first aspect, a multilayer polymer film includes a first transparent, colorless polymer layer comprising a polyimide, a polyamide imide, or a block copolymer of a polyimide and a second transparent, colorless polymer layer comprising a polyimide, a polyamide imide, or a block copolymer of a polyimide. An elastic modulus of the first transparent, colorless polymer layer is different than an elastic modulus of the second transparent, colorless polymer layer. The first and second transparent, colorless polymer layers are bonded by consolidation.

In one embodiment of the first aspect, the first transparent, colorless polymer layer, the second transparent, colorless layer, or both the first and second transparent, colorless polymer layers further include inorganic nanoparticles.

In another embodiment of the first aspect, the polymer of the first transparent, colorless polymer layer is cross-linked, the polymer of the second transparent, colorless polymer layer is cross-linked, or the polymers of both the first and second transparent, colorless polymer layers are cross-linked.

In still another embodiment of the first aspect, the first transparent, colorless polymer layer further includes an imidization catalyst, or the second transparent, colorless polymer layer further includes an imidization catalyst, or both the first and second transparent, colorless polymer layers further include an imidization catalyst.

In yet another embodiment of the first aspect, the multilayer polymer film further includes a third transparent, colorless polymer layer including a polyimide, a polyamide imide, or a block copolymer of a polyimide, and having a third elastic modulus. The second transparent, colorless polymer layer is positioned between the first and third transparent, colorless polymer layers and the second and third transparent, colorless polymer layers are bonded by consolidation. In a specific embodiment, the second elastic modulus is smaller than the first elastic modulus and the third elastic modulus is greater than the second elastic modulus, or the second elastic modulus is greater than the first elastic modulus and the third elastic modulus is greater than the second elastic modulus, or the second elastic modulus is smaller than the first elastic modulus and third elastic modulus smaller than the second elastic modulus. In another specific embodiment, the first elastic modulus and the third elastic modulus are essentially the same, or the first elastic modulus is greater than the third elastic modulus, or the third elastic modulus is greater than the first elastic modulus.

In a second aspect, a cover window for a display includes the multilayer polymer film of the first aspect. The first transparent, colorless layer of the multilayer polymer film is the layer farthest from the display.

In one embodiment if the second aspect, the multilayer polymer film has interfaces between the layers and each of the interfaces has a Mode I interlaminar fracture toughness ($G_{Ic}$) of at least 100 J/m².

In another embodiment of the second aspect, the cover window further includes a layer of transparent material with a high speed of sound positioned between the multilayer polymer film and the display. In a specific embodiment, the transparent material with a high speed of sound has a speed of sound of at least 2000 m/s. In another specific embodiment, the transparent material with a high speed of sound is selected from the group consisting of glass, polyimide, polyamide imide, poly(methyl methacrylate), polyether ketone, polystyrene, polycarbonate, polyester and particle reinforced polymer.

In still another embodiment of the second aspect, the cover window further includes a layer of transparent material with a high speed of sound positioned on the first transparent, colorless layer of the multilayer polymer film on a side opposite the display. In a specific embodiment, the transparent material with a high speed of sound has a speed of sound of at least 2000 m/s. In another specific embodiment, the transparent material with a high speed of sound is selected from the group consisting of glass, polyimide, polyamide imide, poly(methyl methacrylate), polyether ketone, polystyrene, polycarbonate, polyester and particle reinforced polymer.

In yet another embodiment of the second aspect, the cover window of further includes a first layer of transparent material with a high speed of sound positioned between the multilayer polymer film and the display and a second layer of transparent material with a high speed of sound positioned on the first transparent, colorless layer of the multilayer polymer film on a side opposite the display. In a specific embodiment, the first transparent material with a high speed of sound has a speed of sound of at least 2000 m/s, or the second transparent material with a high speed of sound has a speed of sound of at least 2000 m/s, or both the first and second transparent materials with a high speed of sound has a speed of sound of at least 2000 m/s.

Polyimides that contain aromatic monomers are typically very thermally stable and are foldable.

Compositions of block copolymers of polyimides typically are stiffer, i.e., have a higher elastic modulus, than polyimide compositions. For example, the block copolymer can have a longer or higher molecular weight block containing a combination of a more rigid dianhydride and/or a more rigid diamine. In this way, the mechanical properties of the block copolymer can be manipulated relative to the other layers in the multilayer film. In one embodiment, a block copolymer of polyimides will be used for a layer requiring a higher elastic modulus and a polyimide will be used for a layer with a lower elastic modulus.

Polyamide imide compositions typically are stiffer, i.e., have a higher elastic modulus, than polyimide compositions. In one embodiment, a polyamide imide will be used for a layer requiring a higher elastic modulus and a polyimide will be used for a layer with a lower elastic modulus.

In one embodiment, the elastic modulus of a polymer layer can be increased by the presence of inorganic nanoparticles. In another embodiment, the elastic modulus of a polymer layer can be increased by cross-linking between the polymer chains in the polymer layer. In still another embodiment, the elastic modulus of a polyimide layer can be increased by the introduction of an imidization catalyst into the layer.

There are various embodiments of a multilayer polymer film with different numbers of layers and variations on the relative elastic moduli of the layers In one embodiment, there are three transparent, colorless polymer layers, the first layer having a first elastic modulus, the second layer having a second elastic modulus, and the third layer having a third elastic modulus, wherein the second layer is positioned between the first layer and the third layer.

In one three-polymer layer embodiment, the second elastic modulus is smaller than the first elastic modulus and the third elastic modulus is greater than the second elastic modulus. In one such embodiment, the first elastic modulus has been increased by the presence of inorganic nanoparticles in the first polymer layer, by cross-linking between the polymer chains in the first polymer layer, by the introduction of an imidization catalyst into the first polymer layer, or by a combination thereof. Alternatively, in other embodiments, the first polymer layer is a polyamide imide layer or a layer of block copolymer of polyimides, and the second polymer layer is a polyimide. In another such embodiment, the elastic modulus of the third polyimide layer has been increased by the presence of inorganic nanoparticles in the third polymer layer, by cross-linking between the polymer chains in the third polymer layer, by the introduction of an imidization catalyst into the third polymer layer, or by a combination thereof. Alternatively, in other embodiments, the third polymer layer is a polyamide imide layer or a layer of block copolymer of polyimides. In still another such embodiment, the first elastic modulus and the third elastic modulus are essentially the same. In still another such embodiment, the first elastic modulus is greater than the third elastic modulus.

In another three-polymer layer embodiment, the second elastic modulus is smaller than the first elastic modulus and the third elastic modulus is smaller than the second elastic modulus. In one such embodiment, the first elastic modulus has been increased by the presence of inorganic nanoparticles in the first polymer layer, by cross-linking between the polymer chains in the first polymer layer, by the introduction of an imidization catalyst into the first polymer layer, or by a combination thereof. Alternatively, in other embodiments, the first polymer layer can be a polyamide imide layer or a layer of block copolymer of polyimides.

In still another three-polymer layer embodiment, the second elastic modulus is greater than the first elastic modulus and the third elastic modulus is greater than the second elastic modulus. In one such embodiment, the third elastic modulus has been increased by the presence of inorganic nanoparticles in the third polymer layer, by cross-linking between the polymer chains in the third polymer layer, by the introduction of an imidization catalyst into the third polymer layer, when it includes a polyimide, or by a combination thereof. Alternatively, in other embodiments, the third polyimide layer can be a polyamide imide layer or a layer of block copolymer of polyimides.

In another embodiment, there are four polymer layers, the first layer having a first elastic modulus, the second layer having a second elastic modulus, the third layer having a third elastic modulus, and the fourth layer a fourth elastic modulus, wherein the second layer is positioned between the first layer and the third layer and the third layer is positioned between the second layer and the fourth layer.

In one four-polymer layer embodiment, the second elastic modulus is smaller than the first elastic modulus, the third elastic modulus is smaller than the second elastic modulus, and the fourth elastic modulus is larger than the third elastic modulus. In one such embodiment, the first elastic modulus has been increased as described above for the three-polymer layer embodiments. In another such embodiment, the second elastic modulus has been increased as described above for the three-polymer layer embodiments. In yet another such embodiment, the fourth elastic modulus has been increased as described above for the three-polymer layer embodiments. In still another such embodiment, the second elastic modulus and the fourth elastic modulus are essentially the same. In an additional embodiment, the second elastic modulus is larger than the fourth elastic modulus.

In another four-polymer layer embodiment, the second elastic modulus is smaller than the first elastic modulus, the third elastic modulus is smaller than the second elastic modulus, and the fourth elastic modulus is smaller than the third elastic modulus.

In still another four-polymer layer embodiment, the second elastic modulus is smaller than the first elastic modulus, the third elastic modulus is greater than the second elastic modulus, and the fourth layer has a low glass transition temperature and the fourth elastic modulus is smaller than the elastic modulus of any of the other three layers. In still another such embodiment, the first elastic modulus and the third elastic modulus are essentially the same. In an additional such embodiment, the first elastic modulus is larger than the third elastic modulus.

In still another embodiment, there are five polymer layers, the first layer having a first elastic modulus, the second layer having a second elastic modulus, the third layer having a third elastic modulus, the fourth layer a fourth elastic modulus, and the fifth layer having a fifth elastic modulus, wherein the second layer is positioned between the first layer and the third layer, the third layer is positioned between the second layer and the fourth layer and the fourth layer is positioned between the third layer and the fifth layer.

In one five-polymer layer embodiment, the second elastic modulus is smaller than the first elastic modulus, the third elastic modulus is smaller than the second elastic modulus, the fourth elastic modulus is greater than the third elastic modulus, and the fifth layer has a low glass transition temperature and a fifth elastic modulus smaller than the elastic modulus of any of the other four layers and wherein the first elastic modulus is greater than the elastic modulus of any of the other four layers. In one such embodiment, the elastic modulus of the first polymer layer has been increased as described above for the three-polymer layer embodiments. In another such embodiment, the second elastic modulus and the fourth elastic modulus are essentially the same. In still another such embodiment, the second elastic modulus is greater than the fourth elastic modulus.

In another five-polymer layer embodiment, the second elastic modulus is smaller than the first elastic modulus, the third elastic modulus is smaller than the second elastic modulus, the fourth elastic modulus is smaller than the third elastic modulus, and the fifth layer has a low glass transition temperature and a fifth elastic modulus smaller than the elastic modulus of any of the other four layers and wherein the first elastic modulus is greater than the elastic modulus of any of the other four layers. In one such embodiment, the elastic modulus of the first polymer layer has been increased as described above for the three-polymer layer embodiments.

In still another five-polymer layer embodiment, the second elastic modulus is smaller than the first elastic modulus, the third elastic modulus is greater than the second elastic modulus, the fourth elastic modulus is greater than the elastic modulus of any of the other four layers, and the fifth layer has a low glass transition temperature and a fifth elastic modulus smaller than the elastic modulus of any of the other four layers. In another such embodiment, the first elastic modulus and the third elastic modulus are essentially the same. In still another such embodiment, the first elastic modulus is greater than the third elastic modulus.

In another five-polymer layer embodiment, the second elastic modulus is smaller than the first elastic modulus, the third elastic modulus is smaller than the second elastic modulus, the fourth elastic modulus is greater than the elastic modulus of any of the other four layers, and the fifth layer has a low glass transition temperature and a fifth elastic modulus smaller than the elastic modulus of any of the other four layers. Those skilled in the art will understand how to form multilayer polymer films bonded by consolidation having any number of layers and also how to control the relative elastic moduli of each layer.

In one embodiment, a difference between the elastic moduli of two adjacent transparent, colorless polymer layers is at least 5, at least 15 or at least 25%.

Even when using the same polyimide and the same amount of inorganic nanoparticles, the same degree of cross-linking, the same amount of imidization catalyst, the same block copolymer of polyimides, or the same polyamide imide, it is difficult to produce two layers with exactly identical elastic moduli. "Essentially identical" is used herein to describe those layers prepared with the intent and care to have the same elastic moduli.

Various other layers in the configurations described above may also have the elastic modulus increased by the presence of inorganic nanoparticles, by cross-linking between polymer chains, by the introduction of an imidization catalyst, or by a combination thereof.

In one embodiment, the polymer films must be colorless and transparent. Transparency or high transmittance in the visible spectrum (400-700 nm), or between 380 and 780 nm, is necessary. Typical specifications require that both a* and b* are no greater than 1 color unit from neutral (0) in CIE L*, a*, b* color space coordinates. The three coordinates of CIE L*, a*, b* represent: (1) the lightness of the color (L*=0 yields black and L*=100 indicates diffuse white), (2) its position between red/magenta and green (negative a* values indicate green, while positive values indicate magenta) and (3) its position between yellow and blue (negative b* values indicate blue and positive values indicate yellow). For a 50 µm film, the absolute value of a* and b* should each be less than 2, or less than 1.

The polyimides, polyamide imides and block copolymers of polyimides are described in terms of the diamines and dianhydrides used to form them.

Examples of suitable diamines to form the polyimide, polyamide imide and block copolymer of polyimide layers include p-phenylenediamine (PPD), m-phenylenediamine (MPD), 2,5-dimethyl-1,4-diaminobenzene, 2,5-dimethyl-1, 4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenediani-line, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene, 2,4,6-trimethyl-1,3-diaminobenzene.

In one embodiment, a suitable diamine can include a fluorinated diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine], 4,4'-thiobis[(3-trifluoromethyl)benzene amine], 4,4'-sulfoxyl-bis-[(2- trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5-ditrifluoro-methyl)phenyl]benzene (6FC-diamine), 3,5-di-amino-4-methyl-2',3',5',6'-tetrafluoro-4'-tri-fluoromethyldiphenyloxide, 2,2-Bis[4'(4"-aminophenoxy)phenyl]phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB).

In one embodiment, any number of suitable dianhydrides can be used. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride and cyclobutane dianhydride (CBDA).

In one embodiment, a suitable dianhydride can include a fluorinated dianhydride, such as 4,4'-(hexafluoroisopropylidene)diphthalic anhydride (6FDA) and 9,9-bis (trifluoromethyl)-2,3,6,7-xanthene tetracarboxylic dianhydride. In a specific embodiment, the fluorinated dianhydride is 4,4'-(hexafluoroisopropylidene)diphthalic anhydride (6FDA).

In specific embodiments, 6FDA/TFMB and BPDA/6FDA//TFMB polymer layers were used to form multilayers. In one embodiment, a poly(amic acid) blend containing BPDA, 6FDA and TFMB was created by polymerizing BPDA with TFMB and combining with a polyamic acid derived from the reaction of 6FDA with TFMB.

In one embodiment, the elastic modulus of a transparent, colorless polymer layer can be increased by the presence of nanoparticles. The nanoparticles can be inorganic oxides and mixed oxides such as oxides of silicon, aluminum and titanium, hollow (porous) silicon oxide, antimony oxide, zirconium oxide, indium tin oxide, antimony tin oxide, mixed titanium/tin/zirconium oxides and mixtures thereof. The oxides can be oxynitrides, and chalcogenides. For use in a cover window, the nanoparticles must possess a long diameter no greater than ~100 nm to minimize haze and prevent excessive light scatter in the visible region (~400-700 nm). In one example of this invention, silicon oxide nanoparticles (~20-30 nm in diameter) are included in a polyimide layer. The outer layer modulus can be increased while maintaining a softer core layer. Since there is some interdiffusion between layers, the boundary layers where there is intermixing between layers can extend over a distance of 1-2 µm or greater so that the transition in properties between adjacent layers are more gradual.

In one embodiment, the elastic modulus of a transparent, colorless polymer layer can be increased by cross-linking between the polymer chains within the layer. The cross-linking chemistry is targeted within specific layers in which a higher elastic modulus and speed of sound is required. Cross-linking between the polymer chains can be achieved through thermal processing or through UV initiated chemistries.

Thermally induced cross-linking between the polymer chains can be achieved by introducing diacetylene groups into the polymer composition. These acetylene or ethylene groups can be cross-linked with other acetylene or ethylene groups, in some cases by thermally activated processes near the temperature of imidization of the film. Other approaches for thermally initiated cross-linking include the inclusion of monomers with carboxylic acid pendant groups that can decarboxylate at moderate temperatures to generate radicals that can react and form covalent bonds with entities on a neighboring polymer chain. An example of such a monomer which can be co-polymerized into the polyamic acid is 3,5 diaminobenzoic acid, which would generate an aryl radical to initiate cross-linking reactions.

Cross-linking chemistry between polymer chains can also be achieved through the incorporation of diols into the polymer backbone. One such example is 1,4-butylene glycol. In addition, the diols can react with carboxylic acid moieties on neighboring chains (such as those introduced by diaminobenzoic acid) to form an ester linkage between polymer chains.

UV induced cross-linking reactions can also be used, and these may be performed before or after the thermal imidization step. One approach would be to incorporate DAM (2,4,6-trimethyl-1,3-phenylene diamine) into the polymer backbone during the formation of the polyamic acid along with a benzophenone monomer such as BTDA (3',4,4'-benzophenonoetetracarboxylic dianhdride). It is postulated that the benzophenone can react with hydrogen donating moieties on a neighboring chain (such as those on the DAM monomer or another monomer with pendant hydrogen groups) through hydrogen abstraction and subsequent radical coupling between the polymer chains.

Cross-linking and branching between polymer chains can also be achieved by introducing trifunctional monomers (e.g. triamines) into the polymer backbone.

The cross-linking chemistry has a beneficial impact on the interlayer bonding. For instance, if two chemical moieties are needed for the cross-link, one could be used for the polymer composition in each layer. A thermally or UV induced cross-linking reaction can improve the bonding between layers by introducing covalent bonds between polymer chains of two neighboring layers.

In one embodiment, polyimide layer properties can be adjusted by the introduction of imidization catalysts into specific layers. In general, the catalyst will lower the temperature of imidization, increase the crystallinity and increase the polyimide modulus. The concentration and type of catalyst can be used to control properties. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines; lutidine, and trialkylamines. Combinations of the tertiary amines with acid anhydrides can be used. These dehydration agents, which can act as co-catalysts; include acetic anhydride, propionic anhydride, n-butyric anhydride, benzoic anhydride and others. The ratio of these catalysts and their concentration in the polyamic acid layer will influence imidization kinetics and the film properties. Some configurations may have different catalysts introduced into different layers, depending on the properties desired. For instance, for a three-layer polyimide film where the first and third layers possess an increased modulus, the catalysts can be introduced only into those two layers.

Since there is some interdiffusion of solvents between layers, the imidization catalyst can also interdiffuse to some degree as well. This will depend on the catalyst concentration, the thickness of the layers, and the drying profile used to prepare the film. In this way, a property gradation from one layer to another can be achieved.

Adjacent polymer layers of the multilayer polymer film are bonded by consolidation. Consolidation is a welding process rather than an adhesion process. The layers to be consolidated or welded must be capable of undergoing a physical change—melting and solidification. There is heat transfer to soften and melt the layers to be consolidated together. The surfaces are brought together and allowed to accomplish intimate molecular contact. There is polymer interdiffusion by reptation (snake-like) motion. This accomplishes strong bonds as the long polymer chains move across the interface of the two layers to be consolidated. It is common for the reconsolidated interface to be undetectable.

In this process, the polyamic or polyimide amic acids are either cast as polyamic acid layers, partially imidized polyamic layers, polyamide amic acids, soluble polyimides or soluble polyamide imides. These layers can be cast in a co-extrusion process that results in consolidation. In this process, the polyamic acid polymer chains can co-mingle; there can be co-entanglement of the polyamic or polyimide amic acids layers, partially imidized polyamic layers, polyimide amic acids, soluble polyimide or soluble polyamide imides chains between neighboring layers as discussed above. There will be greater interlayer bonding than can be conventionally achieved by coating one formulation onto a second pre-formed polymer substrate. When the multi-layer is based on polyamic acid, it can be imidized in a separate step, so that the entire multilayer is cured or imidized simultaneously. If the material is co-extruded using a multicavity die with independent polyamic acid streams, there is also a significant manufacturing cost advantage, because the layers are formed and combined in a single or cascaded casting process (as opposed to sequentially coating one film layer on top of the other). In one embodiment, multiple slot dies can be slightly cascaded.

In one embodiment, the multilayer polymer film is prepared by simultaneously extruding the layers. In some embodiments, the layers are extruded through a single or multi-cavity extrusion die. In one embodiment, the multilayer film is produced using a single-cavity die. If a single-cavity die is used, the laminar flow of the streams should be of high enough viscosity to prevent comingling of the streams and to provide even layering. In one embodiments, the multilayer polymer film is prepared by casting from a slot die onto a moving stainless-steel belt. In a specific embodiment including a polyimide layer(s), the belt is then passed through a convective oven, to evaporate solvent and partially imidize the polymer, to produce a "green" film. The green film can be stripped off the casting belt and wound up. The green film can then be passed through a tenter oven to fully cure the polyimide. In some embodiments, during tentering, shrinkage can be minimized by constraining the film along the edges (i.e. using clips or pins).

In some embodiments, layers can be formed by successive coatings of the polyamic acid, polyamic imide, soluble polyimide, or soluble polyamide imides. For instance, solutions of these polymers can be sequentially deposited by slot die coating, casting, or similar processes.

In one embodiment, outer layers of a multilayer polymer film can be applied to a core layer or during an intermediate manufacturing stage of film formation, such as to gel film or to green film.

Also provided is a cover window for a display comprising a multilayer polymer film of the invention. The first layer of each of the various multilayer variations is the layer farthest from the display.

In an impact resistance structure such as the cover window, the velocity at which stresses propagate in a material must be high to allow dissipation of the initial kinetic energy over a large volume of the structure, and to enhance the interchange of momentum between an impactor and the target. Sound, a mechanical wave, and stresses propagate at various wave speeds in a material. Different modes of deformation result in different waves speeds (longitudinal, distortional, rayleigh, etc.) in a material.

Herein reference to the high speed of sound layer means the speed of the longitudinal wave in the material. This is the fastest elastic wave in a material. It is common to refer to the speed of the longitudinal wave as the speed of sound in the material. For an isotropic material, the longitudinal wave speed equation is $$C_L = \sqrt{\frac{(1-v)}{(1+v)(1-2v)}\frac{E}{\rho}}$$

where,
E is the elastic modulus of the material
v is the Poisson's ratio of the material
$\rho$ is the density of the material In an embodiment, the interfaces in the multilayer polymer film have a Mode I interlaminar fracture toughness ($G_{Ic}$) of at least 100, at least 500, at least 1500 or at least 3000 J/m$^2$.

In one embodiment, the cover window further comprises a layer of transparent material with a high speed of sound positioned between the multilayer polymer film and the display. In one such embodiment, the speed of sound of the transparent material with a high speed of sound is at least 2000, at least 2500 or at least 3000 m/s. In another such embodiment, the transparent material with a high speed of sound is glass, polyimide, polyamide imide, poly(methyl methacrylate), polyether ketone, polystyrene, polycarbonate or polyester. In still another such embodiment, the transparent material with a high speed of sound is a particle reinforced polymer.

In another embodiment, the cover window further comprises a layer of transparent material with a high speed of sound positioned above the first layer of the multilayer polymer film. In one such embodiment, the speed of sound of the transparent material with a high speed of sound is at least 2000, at least 2500 or at least 3000 m/s. In another such embodiment, the transparent material with a high speed of sound is glass, polyimide, polyamide imide, poly(methyl methacrylate), polyether ketone, polystyrene, polycarbonate or polyester. In still another such embodiment, the transparent material with a high speed of sound is a particle reinforced polymer.

In another embodiment, the cover window further comprises two layers of transparent material with a high speed of sound, one layer positioned between the multilayer polymer film and the display and one layer positioned above the first layer of the multilayer polymer film. In one such embodiment, the speed of sound of the transparent material with a high speed of sound is at least 2000, at least 2500 or at least 3000 m/s. In another such embodiment, the transparent material with a high speed of sound is glass, polyimide, polyamide imide, poly(methyl methacrylate), polyether ketone, polystyrene, polycarbonate or polyester. In still another such embodiment, the transparent material with a high speed of sound is a particle reinforced polymer.

EXAMPLES

Test Methods

Elastic Modulus

The elastic modulus was measured using a nanoindenter specially configured to measure the stiffness of films. Nanoindentation measures a transverse modulus with some in-plane modulus component, ideal for a thin film. A nanoindenter (Hysitron TI 980 TriboIndenter, Bruker, Minneapolis, Minn.) was used to characterize the film indentation modulus. The nanoindenter had load and displacement resolutions of 1 nN and 0.04 nm, respectively, and was operated in continuous stiffness mode whereby the indenter tip was continuously oscillated at a 1-2 nm amplitude for improved surface detection and extraction from a single measurement of mechanical properties as a function of indentation depth. A standard Berkovich tip whose projected contact area function was calibrated to an indentation depth from 50 nm and above by making 20 to 25 indentations on each specimen. The indicated films were mounted on sample holders using an adhesive to sample mounts. Indentations were made on each coating in at least six different locations once the test system had reached a thermal drift of ~0.1-0.2 nm/sec. After measurements, subsequent to the measurement, three to five indentations were again made on the specimen to verify the previous calibration.

Interlaminar Fracture Toughness in Mode I ($G_{Ic}$)

Interfacial bond strength was measured with a double-cantilever beam test. The test uses a 1"×6" multilayer film specimen. This specimen was adhered top and bottom with 1"×6" aluminum backing bars to limit the sample deflection under load, and to attach to loading blocks. The result is a sandwich as follows: Al bar/'A' Layer/6' layer/A' layer/Al bar. Then, loading blocks were attached to the aluminum backing bars top and bottom. The samples were tested in an ElectroForce 1000 load frame equipped with a 1000 lb load cell. The test purposefully creates an initial crack between the weakest layers and propagates that crack along the interface while measuring the transverse load, the opening displacement, and the crack length along the specimen long axis. If the crack can be easily created, the interfacial adhesion is low or modest and $G_{Ic}$ can be measured. If the crack cannot be created, the interlaminar adhesion is high, or is not adhesion at all, but instead consolidation. A fully consolidated tri-layer stack should not be able to be separated. The locus of failure should be elsewhere.

Thickness

Cross-sectional scanning electron microscope (SEM) images of films were obtained to determine the thicknesses of the multilayer films and the individual film layers. Film samples were cut and mounted in an epoxy and allowed to dry overnight. The samples were then polished using a Buehler variable speed grinder/polisher and placed into a desiccator for about two hours to ensure dryness. Images were captured using a Hitachi S-3400 SEM (Hitachi High Technologies America, Inc., Schaumburg, Ill.) under variable pressure.

Example 1

For Example 1 (E1), multilayer films were cast by co-extrusion to form 'ABA' type layers by consolidation. Three separate polyamic polymer streams were simultaneously extruded through a multi-cavity extrusion die onto a heated moving belt to form a co-extruded three-layer polyamic acid film that can be cured to form a three-layer polyimide film. The thicknesses of the polyimide core layer (second transparent, colorless polymer layer) and the top and bottom outer layers (first and third transparent, colorless polymer layers) were adjusted by varying the amounts of polyamic acids fed to the extruder. Silicon oxide nanoparticles were introduced into the outer CA' layers, to increase the layer modulus.

To prepare the core layer (second transparent, colorless polymer layer), in a nitrogen purged 80-gallon reactor, 16.20 kg of trifluoromethyl-benzidine (TFMB, Seika Corporation, Wakayam Seika Kogyo Co., LTD., Japan) and 143.34 kg of dimethyl acetamide (DMAC) were stirred and agitated. 21.91 kg of 4,4'-(hexafluoroisopropylidene)diphthalic anhydride (6FDA, Synasia, Metuchen, N.J.) were added in four separate aliquots over a 6 hours period. The reaction mixture was maintained at ~40° C. during this procedure. Eight additional aliquots of 36.145 g of 6FDA were added to the reaction mixture over a period of ~3 hours. The viscosity of the pre-polymer was ~60 poise.

A portion of the polymer was polymerized ("finished") to ~1200-1300 poise using a mixture of 6 wt % pyromellitic dianhydride (PMDA) in DMAC in a nitrogen purged reactor. The material was polymerized with the PMDA solution over the course of ~24 hours at 40° C.

To prepare the outer polymer layers (first and third transparent, colorless polymer layers), a portion of the polymer used in the core layer was also co-extruded in the outer skin layer. However, this layer was co-mingled with a stream of silicon oxide nanoparticles. The silicon oxide nanocolloid was injected into this outer layer. The colloid contains silicon oxide nanoparticles which are ~20-30 nm in diameter and are colloidally dispersed at ~31 wt % in DMAC. The product was derived from a Ludox® TMA colloid silica product in water (Sigma-Aldrich, St. Louis, Mo.). The colloid was deionized (Na ions removed) by exchanging with Dowex® HCR-W2 resin (hydrogen form, Sigma-Aldrich). The deionized Ludox® TMA was exchanged into DMAC solvent by distillation. During the final part of the exchange, a trimethoxy phenylsilane capping agent was introduced into the colloid mixture to functionalize the nanoparticles. The nanoparticle stream was introduced at the required volumetric rate to create a silicon oxide nanoparticle enriched outer layer, with ~13 vol % $SiO_2$ nanoparticles.

The multilayer polymer film was formed by co-extrusion. The flow rates of the polyamic acid solutions were adjusted to yield a three-layer co-extruded film, in which the outer layers were ~5-6 µm after drying. The inner core layer was ~35-36 µm. The extruded multilayer polymer film was dried at an oven temperature in the range of from about 95 to about 150° C. to produce a green film containing some DMAC solvent.

The dried film was mounted on a 3×8-inch pin frame to secure it and placed in a furnace (Thermolyne™ F6000 box furnace, Thermo Fisher Scientific, Inc., Waltham, Mass.). The furnace was nitrogen purged and heated according to the following temperature protocol:

25 to 45° C. (5° C./min), hold at 45° C. for 5 minutes;

45 to 150° C. (20° C./min), hold at 150° C. for 10 minutes;

150 to 250° C. (20° C./min), hold at 250° C. for 10 minutes;

250 to 350° C. (20° C./min), hold at 350° C. for 5 minutes.

The films were removed "hot" from the oven after heating to 350° C. for 5 minutes and allowed to cool in air.

Example 2

For Example 2 (E2), the same procedures as described in E1 were used, except that the flow rate of the silicon oxide colloid was increased to increase the concentration of silicon oxide nanoparticles in the outer layers to ~18 vol %.

High resolution microscopy was used to observe the interfaces between the layers of the multilayer polymer films. Films were prepared as described above in E1 and E2, except that instead of curing the films in a furnace, self-supported films were heated with radiant heaters in a tenter oven from about 180 to about 620° C. (radiant heater surface temperature) to completely dry and imidized the polymers. Samples were prepared by ultra-microtome to capture transmission electron microscopy (TEM) cross-section images of the films. The transition regions from the outer layers and the core is very gradual. Some silicon oxide nanoparticles are present in this interface region, and there is no clear boundary between the outer layers and the core layer. This microstructure results in high adhesion between the outer and the core layers due to bonding by consolidation.

In both E1 and E2, the nanoindentation modulus of the unreinforced CB' layer was 4.53 GPa. In the case with the higher level of particle reinforcement, the CA' layer measured 5.57 GPa modulus, some 23% higher than the modulus of the CA' layer. In the case with the lower level of particle reinforcement, the CA' layer measured 5.46 GPa modulus, some 21% higher than the modulus of the CA' layer (Table 1).

TABLE 1

| Example | Layers | Vol % $SiO_2$ in Layer A | Vol % $SiO_2$ in Layer B | Avg. Modulus in Layer A (GPa) | Avg. Modulus Layer in B (GPa) |
|---|---|---|---|---|---|
| E1 | A/B/A | 18.3 | 0 | 5.57 | 4.53 |
| E2 | A/B/A | 13.3 | 0 | 5.46 | 4.53 |

Interfacial strength of both E1 and E2 was the same or nearly the same as the strength of the parent material as measured by a interlaminar fracture toughness test in Mode I ($G_{Ic}$). Our attempt to measure the weakest $G_{Ic}$ of the consolidated tri-layer structure using the double-cantilever beam test was unsuccessful due to the strength of the interfaces. We were unable to create the initial crack region between the consolidated interfaces. Instead, the locus of failure was in the epoxy layer used to join the consolidated structure to the aluminum beams. Thus, we know the $G_{Ic}$ of the consolidated interfaces is higher than that of the epoxy-aluminum interface. Previous studies Alfano et al., "Analysis of Fracture in Aluminum Joints Bonded with a Bi-Component Epoxy Adhesive," Journal of Testing and Evaluation, Vol. 39, No. 2, 2010) reports $G_{Ic}$ values of around 2000 J/m² for a similar Aluminum/Epoxy interface. This suggests that the interfaces of the consolidated interfaces of the tested sample was higher than 2000 J/m².

What is claimed is:

1. A multilayer polymer film comprising:
   a first transparent, colorless polymer layer comprising a polyimide, a polyamide imide, or a block copolymer of a polyimide, and having a first elastic modulus; and
   a second transparent, colorless polymer layer comprising a polyimide, a polyamide imide, or a block copolymer of a polyimide, and having a second elastic modulus, wherein:
   the polymers of both the first and second transparent, colorless polymer layers are cross-linked;
   the first elastic modulus is different from the second elastic modulus; and
   the first and second transparent, colorless polymer layers are bonded by consolidation and cross-linking.

2. The multilayer polymer film of claim 1, wherein the first transparent, colorless polymer layer, the second transparent, colorless layer, or both the first and second transparent, colorless polymer layers further comprise inorganic nanoparticles.

3. The multilayer polymer film of claim 1, wherein: (i) the first transparent, colorless polymer layer further comprises an imidization catalyst, or (ii) the second transparent, colorless polymer layer further comprises an imidization catalyst, or (iii) both the first and second transparent, colorless polymer layers further comprise an imidization catalyst.

4. The multilayer polymer film of claim 1, wherein a Mode I interlaminar fracture toughness ($G_{Ic}$) between the first and second transparent, colorless polymer layers is at least 500 J/m².

5. The multilayer polymer film of claim 1, wherein a difference between the elastic moduli of the first and second transparent, colorless polymer layers is at least 5%.

6. The multilayer polymer film of claim 1, further comprising a third transparent, colorless polymer layer comprising a polyimide, a polyamide imide, or a block copolymer of a polyimide, and having a third elastic modulus, wherein the second transparent, colorless polymer layer is positioned between the first and third transparent, colorless polymer layers and the second and third transparent, colorless polymer layers are bonded by consolidation.

7. The multilayer polymer film of claim 6, wherein a difference between the elastic moduli of the second and third transparent, colorless polymer layers is at least 5%.

8. The multilayer polymer film of claim 6, wherein: (i) the second elastic modulus is smaller than the first elastic modulus and the third elastic modulus is greater than the second elastic modulus, or (ii) the second elastic modulus is greater than the first elastic modulus and the third elastic modulus is greater than the second elastic modulus, or (iii) the second elastic modulus is smaller than the first elastic modulus and third elastic modulus smaller than the second elastic modulus.

9. The multilayer polymer film of claim 6, wherein: (i) the first elastic modulus and the third elastic modulus are essentially the same, or (ii) the first elastic modulus is greater than the third elastic modulus, or (iii) the third elastic modulus is greater than the first elastic modulus.

10. The multilayer polymer film of claim 6, wherein the third transparent, colorless polymer layer is cross-linked.

11. The multilayer polymer film of claim 10, wherein the second and third transparent, colorless polymer layers are further bonded by cross-linking.

12. The multilayer polymer film of claim 6, wherein a Mode I interlaminar fracture toughness ($G_{Ic}$) between the second and third transparent, colorless polymer layers is at least 500 J/m$^2$.

* * * * *